United States Patent [19]

Duttarer

[11] 4,116,486
[45] Sep. 26, 1978

[54] RETRACTABLE ROCK GUARD FOR A DUMP TRUCK BODY

[75] Inventor: Ralph M. Duttarer, St. Joseph, Mich.

[73] Assignee: Clark Equipment Company, Buchanan, Mich.

[21] Appl. No.: 789,591

[22] Filed: Apr. 21, 1977

[51] Int. Cl.² ............................................. B60P 1/28
[52] U.S. Cl. .................................. 298/17 R; 298/1 R; 298/22 P
[58] Field of Search ................... 298/1 R, 17 R, 22 F, 298/22 J, 22 P, 22 A, 22 B, 22 D

[56] References Cited

U.S. PATENT DOCUMENTS

| | | | |
|---|---|---|---|
| 2,974,997 | 3/1961 | Parsley | 298/17 R |
| 3,211,498 | 10/1965 | Peller | 298/22 P |

*Primary Examiner*—Robert G. Sheridan
*Assistant Examiner*—George F. Abraham
*Attorney, Agent, or Firm*—Kenneth C. Witt

[57] ABSTRACT

A retractable rock guard for the dump body of a truck, comprising a protective structure which is normally in the upright position at the front of the dump body. The protective structure is pivotally connected to the dump body but ordinarily is secured in the normal upright position by detachable connectors. However, it can be readily detached and then the protective structure can be retracted by raising the dump body to a dump position in the usual manner. The upright protective structure is constructed and arranged so that its center of mass passes through a vertical plane intersecting its pivotal connection on the dump body under these circumstances and when this occurs the proctective structure moves to a horizontally disposed retracted position on the truck body.

3 Claims, 3 Drawing Figures

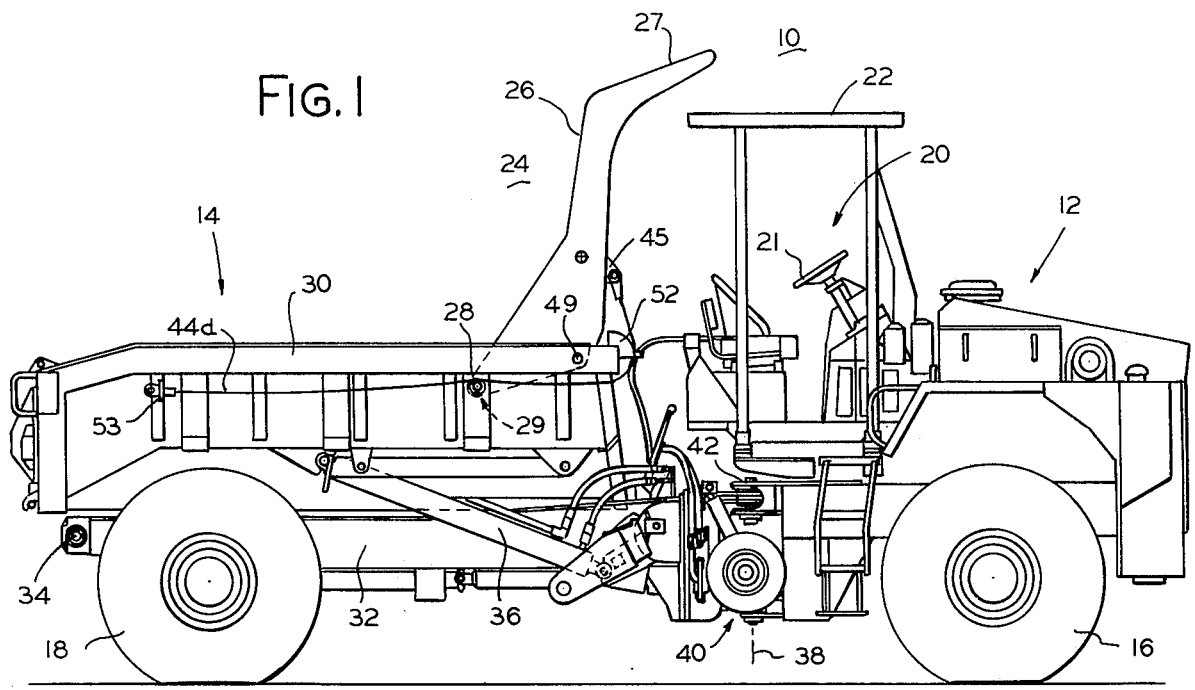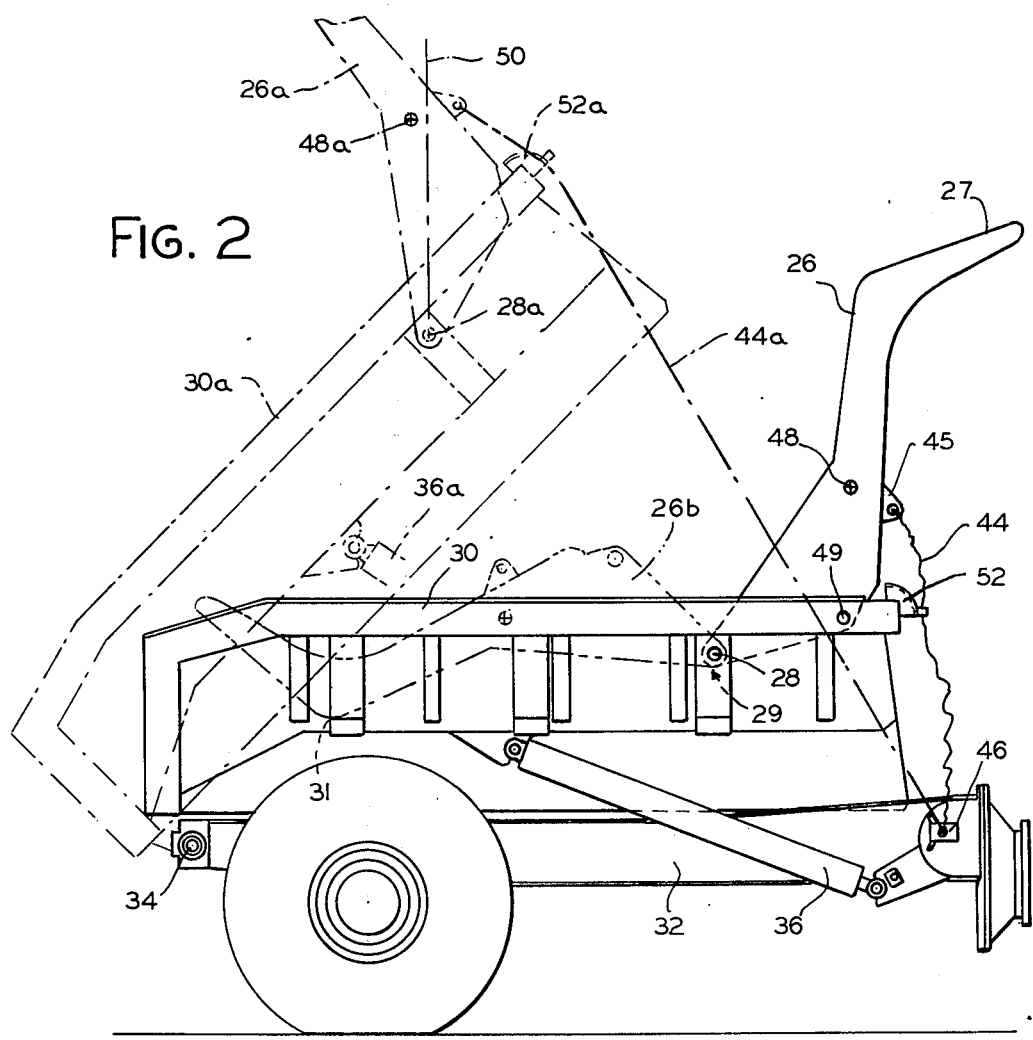

RETRACTABLE ROCK GUARD FOR A DUMP TRUCK BODY

The Government has rights in this invention pursuant to Contract No. DAAE-7-75-C-0051 awarded by the Department of Defense.

BACKGROUND OF THE INVENTION

1. Field of the Invention

This invention relates to rock guards which are commonly installed at the front of the dump bodies of rear dump trucks. Such guards include upright protective structures which have a portion projecting out at least partially over the cab of the truck and over other parts of the truck in order to protect the cab and other parts from the materials which are loaded into the truck body.

Such materials may be loaded into the truck body by mobile loaders, by backhoes or other excavators, by means of conveyor belts, and in other ways. Regardless of the method of loading it is frequently desirable to protect the cab and other portions of the truck from the materials being loaded because sometimes the loading machine or device projects the materials too far forward and they fall onto the cab or other portions of the truck. Rocks are the most common item against which such protection is needed because they are most likely to cause damage and that is the reason such structures are called "rock guards" even though they protect the cab and other parts of the truck against damage from whatever is being loaded into the truck.

2. Description of Prior Art

Heretofore the protective structures of such rock guards have been fabricated and then assembled on the front of the dump body of a truck, but if the height of the protective structure was too great to allow the truck to pass through a particular opening, or for some other reason it was desired to fully or partially retract the protective structure it ordinarily has been necessary to fully or partially dissassemble the protective structure.

The object of the present invention is to provide a rock guard including a protective structure which is readily retractable from the normal operating position to a retracted position in which it is supported in horizontally disposed relation on the floor of the dump body.

SUMMARY OF THE INVENTION

A retractable rock guard for a dump body of a truck, the dump body being horizontal in the transport condition but pivotally connected near its rear extremity to a fixed frame portion of the truck. The dump body can be moved to a dump position to discharge material from the dump body by pivoting the dump body upwardly to a dump position; after the material is discharged the body is returned to a normal horizontal position. The retractable rock guard comprises an upright protective structure normally located at the front of the dump body. The protective structure is pivotally connected about a horizontal axis to the dump body and is normally secured in the upright position but it can be detached to enable the protective structure to pivot with respect to the dump body when it is desired to retract the protective structure. The protective structure is of a configuration such that when it is freed for pivotal movement on the dump body and the dump body is raised to a dump position the center of mass of the upright structure passes through a vertical plane intersecting the pivotal connection between the protective structure and the dump body. This causes the protective structure to pivot rearwardly down on to the dump body.

BRIEF DESCRIPTION OF THE DRAWING

FIG. 1 is a side elevational view of a truck embodying the present invention,

FIG. 2 is a partial view of the truck of FIG. 1 on a larger scale illustrating the operation of the invention.

DESCRIPTION OF A PREFERRED EMBODIMENT

Figure 3:
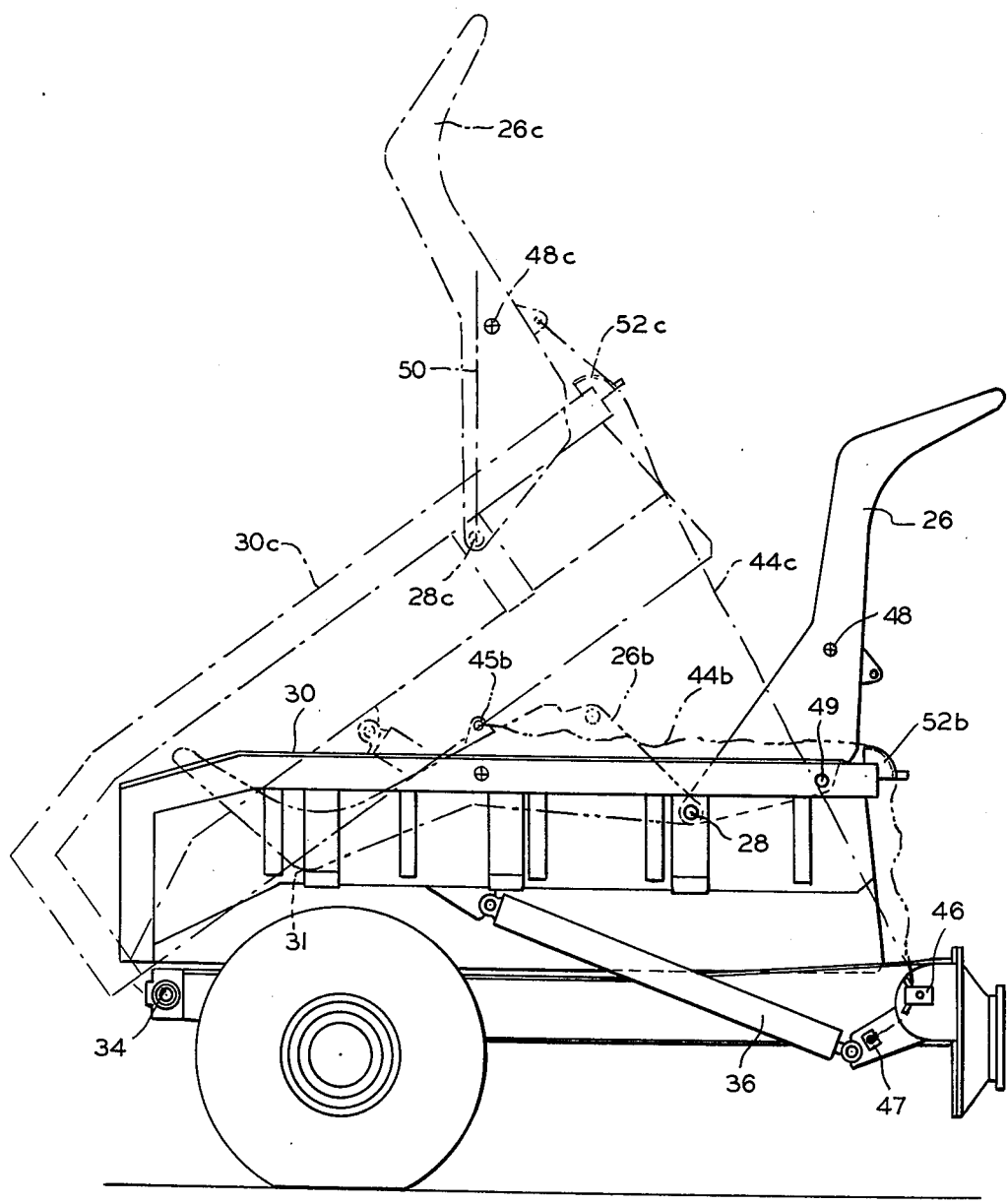
FIG. 3 is a view similar to FIG. 2 except illustrating another portion of the operation of the invention.

Referring to FIG. 1 of the drawing the numeral 10 indicates generally a truck which consists of a front portion 12 and a rear portion 14. The front portion 12 includes a pair of wheels 16, only one of which is visible, while the rear portion 14 includes a pair of wheels 18, only one of which is visible.

The front portion 12 of the truck also includes an operator's station indicated generally at 20 where the various controls necessary for operating the truck are located. Over the operator's station is a cab indicated at 22.

The rear portion 14 of the truck includes the retractable rock guard structure of this invention which is designated generally by the numeral 24 and includes a protective structure 26 which is normally upright as shown in FIG. 1 and is pivotally mounted about a horizontal axis 28 on a dump body 30. The dump body 30, which is normally horizontally disposed, as in FIG. 1, is in turn pivotally connected to a fixed frame portion 32 adjacent the rearward extremity of both, the connection being about a horizontal axis 34 which permits the body 30 to pivot upwardly and downwardly with respect to fixed frame portion 32. The upward or counterclockwise pivotal movement of body 30 to a dump position as illustrated in FIGS. 2 and 3 is accomplished by means of a pair of hydraulic cylinders or actuators 36 located one on each side of the rear portion 14 of the vehicle and operated by suitable controls.

The truck 10 which is illustrated is a pivot steer type vehicle in which steering of the truck while it is in motion is accomplished by pivoting the front portion 12 with respect to the rear portion 14 about a pivot axis 38 through a pair of pivot connections 40 and 42, such pivoting being accomplished by a pair of hydraulic cylinders or actuators controlled by the operator's steering wheel 21. For more details on a similar steering mechanism see U.S. Pat. No. 3,889,976 dated June 15, 1975. It will be appreciated, however, that the present invention is not limited to use with a pivot steer truck but is equally applicable to other types of trucks such as a single frame vehicle with Ackermann steering or other known type.

The protective structure 26 with its forwardly projecting portion 27 provides protection for the cab 22 and other parts of truck from rocks and other materials which are being loaded into the dump body 30, that is, the protective structure 26 helps prevent such materials from falling on the cab or other parts of the truck, instead deflecting such materials into the dump body 30.

The structure 26 has two pivot connections designated 29 on the opposite inside vertically disposed surfaces of body 30 which allow structure 26 to pivot about axis 28. These pivot connections 29 are arranged so that the structure 26 can be pivoted from the upright position of FIG. 1 which is also shown as the solid line position in both FIGS. 2 and 3 to the double-dot-dash line retracted position indicated at 26b in FIGS. 2 and 3. In the latter position the structure 26 is supported between the pivot connections 29 and location 31 where the structure 26 rests on the bottom of body 30.

FIGS. 2 and 3 show two intermediate or transitory positions which illustrate respectively the manner in which the structure member 26 is retracted and the manner in which it is erected again. In FIG. 2 the transitory position of structure 26 is shown in dot-dash lines and indicated by the identifying character 26a, and other related parts of the retractable rock guard also have the suffix a in this position. In FIG. 3 a somewhat different transitory position is shown, also in dot-dash lines, in which the structure 26 is indicated by the character 26c and the related parts of the retractable rock guard also have the suffix c for this position.

In order to retract the structural member 26 the first step is to connect a flexible member 44 between a boss 45 on structure 26 and a bracket 46 on the fixed frame 32 of the truck. Member 44 is slack when it is initially connected between points 45 and 46 and this is illustrated diagrammatically by the wavy line in FIG. 2. In the preferred embodiment there are two flexible members 44, preferably flexible steel cables, one on each side, with one being the mirror image of the other.

During normal operation of the truck 10 the dump body 30 is filled with material while the body is in the position indicated in FIG. 1. Then the truck is driven to the desired unloading site where the dump body is raised to a position 30a as illustrated by the dot-dash lines in FIG. 2 by the extension of hydraulic actuators 36. A partial view of one actuator in the extended condition is indicated at 36a in FIG. 2. The material in the dump body is discharged by gravity, that is, it slides out the back end of the dump body. Then the actuators 36 are retracted to restore dump body 30 to its normal position. During such normal operation of the truck the structure 26 is secured to the body 30 by means of detachable connections 49 between structure 26 and body 30, there being a connection 49 on each side of the body.

When it is desired to retract structure 26, connections 49 on both sides are disconnected, making structure 26 free to pivot with respect to body 30 if suitable forces to cause such pivoting are applied. Members 44 are installed between locations 45 and 46 in the manner previously described. Then, dump body 30 is raised by extending actuators 36 until the dump body reaches the dump position indicated by the dot-dash lines 30a in FIG. 2.

When such dumping position is reached, the center of mass 48 of structure 26 which is now at location 48a has passed through a vertical plane 50 intersecting pivot axis 28a. This means that structure 26 which is indicated at 26a by the dot-dash line in this position will pivot to the left or counterclockwise as shown in FIG. 2 or rearwardly with respect to the truck.

The flexible member which is shown at 44a as a dot-dash line in FIG. 2 is of a length which supports and restrains member 26 and prevents it from pivoting downwardly in an uncontrolled manner. Instead, as the actuators 36 are retracted again the member 26 pivots rearwardly or to the left in FIG. 2 and when the dump body 30 has reached its normal horizontally disposed position member 26 is then in the position indicated by the dash-double-dot lines of 26b supported at 31 on the bottom of dump body 30.

It will be appreciated that it is necessary to have guides 52, of which there is one on each side, mounted on dump body 30 in order to maintain the desired effective length of the flexible members 44 during the just described lowering operation. The guides 52 are located in a position which causes the flexible members 44 to maintain tension on structure 26 for most of the just described lowering operation to the retracted position, to prevent the structure 26 from falling unrestrained. The guides 52 also are useful in erecting structure 26 again, that is, moving it from the retracted position back to the operating position.

The manner in which such erection is accomplished is illustrated in FIG. 3 of the drawing. In preparing to carry out such erection, the members 44 are connected differently from the arrangement for the retracting operation. As shown in FIG. 3 by the double-dot-dash lines and indicated by the identifying character 44b, the flexible member is connected between boss 45, which is indicated as 45b in the retracted position in FIG. 3, from where it is trained over the guide as indicated at 52b in FIG. 3 and thence it passes through a guide opening in bracket 46 and is connected at bracket 47. It will be appreciated that the result of the extension of the connection of the lower end from 46 to 47 is to shorten the flexible member by that amount insofar as the effect on structure 26 is concerned.

After the flexible members 44 have been connected as illustrated at 44b in FIG. 3, actuators 36 are extended to move dump body 30 to the dump position illustrated at 30c in FIG. 3. As the dump body 30 pivots upwardly (counterclockwise) about axis 34 member 26 also pivots upwardly (clockwise) with respect to dump body 30 about axis 28 until member 26 reaches the position indicated in dot-dash lines and designated 26c in FIG. 3. Various parts have been shown with the suffix c in FIG. 3 in this position in order to distinguish the positions of the various parts from the similar but different positions indicated by the suffix a in FIG. 2.

It will be observed that when this position has been reached the center of mass, which is designated as 48c in the dump position of FIG. 3, has moved back through vertical plane 50 which intersects pivot axis 28c and is to the right or forwardly of such plane. As a result, structure 26 pivots forwardly under the force of gravity until it reaches its normal operating position resting on dump body 30. It will be appreciated that because of the configuration of the parts there is little drop by structure 26 after the center of mass passes through the plane when the structure 26 is moving back to the erected position as in FIG. 3. The length of the flexible members 44 preferably should be selected so that the small drop of member 26 after the center of mass passes through the plane 50 causes flexible members 44 to go slack. This is indicated by the slight sag of member 44c in FIG. 3.

The actuators 36 are then operated to lower the dump body 30 back to its horizontal position again as shown in solid lines in FIG. 3 and the connectors 49 are put in place to once again secure structure 26 to the body 30.

The flexible members 44 may be stored on the respective sides of the body 30, during normal operation of the truck, by connecting one end of each member at boss 45 and with the member trained over guide 52 securing the other end at 53 on the side of the body, as shown at 44d in FIG. 1.

While I have described and illustrated herein the best mode contemplated for carrying out this invention it will be appreciated that modifications may be made by those skilled in the art. Accordingly it should be understood that I intend to cover by the appended claims all such modifications which fall within the true spirit and scope of my invention.

I claim:

1. A retractable rock guard for a truck dump body, the dump body being normally horizontally disposed and pivotally connected near its rear extremity about a horizontal axis to a fixed frame portion of the truck and being selectively movable between the normal horizontally disposed position and a raised dump position, the retractable rock guard comprising a protective structure normally located in an upright position adjacent the front of the dump body and pivotally connected about a second horizontal axis to such dump body, means for detachably securing said protective structure to the dump body at a point spaced from said second horizontal axis, said securing means being operable to disconnect said protective structure from the dump body at said point when retraction is desired, the said protective structure being constructed and arranged so that when the dump body is raised to a dump position the center of mass of the protective structure passes through a vertical plane intersecting said second horizontal pivot axis and the protective structure pivots to the rear and retracts downwardly onto the dump body.

2. A retractable rock guard as in claim 1 including a flexible member connectible between the fixed frame portion of the truck and said protective structure and of sufficient length to permit center of mass of the protective structure to pass through the vertical plane intersecting said second horizontal pivot axis when the dump body is in said dump position, and a guide secured to the dump body over which said flexible member is trained, said guide being located in a position such that said flexible member restrains said protective structure during at least a portion of its downward movement toward the dump body.

3. A retractable rock guard as in claim 2 in which a second connecting point is provided for said flexible member on the fixed frame portion of the truck which has the effect of shortening the operative portion of said flexible member, whereby said protective structure can be re-erected by connecting said flexible member to said second connection point and training it over said guide and connecting it to said protective structure and then raising the dump body to a second dump position, the said flexible member under these conditions causing the said center of mass of the protective structure to pass back through said vertical plane intersecting said second horizontal pivot whereby said protective structure returns to its normal operating position.

* * * * *